United States Patent [19]
Cox

[11] Patent Number: 4,735,245
[45] Date of Patent: Apr. 5, 1988

[54] WORKTABLES HAVING RIP FENCES

[75] Inventor: Alan W. Cox, Cockfield, England

[73] Assignee: Black & Decker Inc., Newark, Del.

[21] Appl. No.: 913,715

[22] Filed: Sep. 30, 1986

[30] Foreign Application Priority Data

Oct. 2, 1985 [GB] United Kingdom ................ 8524274

[51] Int. Cl.[4] ............................................. B27G 19/00
[52] U.S. Cl. ................................ 144/251 R; 83/440.2;
83/545; 83/574; 83/860; 144/286 R; 269/139
[58] Field of Search ....................... 83/478, 440.2, 544,
83/545, 546, 860, 574; 144/251 R, 251 A, 253 J,
286 R; 269/139

[56] References Cited

U.S. PATENT DOCUMENTS

| 915,496 | 3/1909 | Sodergren | 144/253 J |
|---|---|---|---|
| 1,947,885 | 2/1934 | Tautz | 144/253 J |
| 3,754,493 | 8/1973 | Niehaus et al. | 144/251 R |
| 4,061,323 | 12/1977 | Beekenkamp . | |
| 4,127,260 | 11/1978 | Hickman . | |

FOREIGN PATENT DOCUMENTS

| 230642 | 3/1925 | United Kingdom . | |
|---|---|---|---|
| 374207 | 6/1932 | United Kingdom | 144/253 J |
| 454851 | 10/1936 | United Kingdom . | |
| 507326 | 6/1939 | United Kingdom . | |
| 519187 | 3/1940 | United Kingdom . | |
| 1551203 | 8/1979 | United Kingdom . | |

OTHER PUBLICATIONS

British Search Report, 11-11-85.

Primary Examiner—W. Donald Bray
Attorney, Agent, or Firm—Edward D. Murphy; Harold Weinstein; Edward D. C. Bartlett

[57] ABSTRACT

A worktable has a table top with a slot for reception of a saw blade of a hand-held circular saw when mounted below the table top. Two rip fences mounted on the table top are separately slidable in parallel adjusting slots for adjusting independently the position of each fence. A hole in the table top adjacent the middle of the saw blade slot accommodates a cutting tool of a portable router when mounted below the table top. A router guard may be pivotally attached to a raised support structure between the rip fences. A riving knife is adjustably mounted in alignment with the saw blade slot. A saw blade guard is pivotally mounted on the riving knife.

19 Claims, 10 Drawing Sheets

WORKTABLES HAVING RIP FENCES

FIELD OF THE INVENTION

This invention relates to work surfaces and has particular reference to worktables for use with or as workbenches.

BACKGROUND OF THE INVENTION

Machine tools, dedicated to a specific function, e.g. a table saw, are well known, each such machine tool being a stationary tool and having a base or leg structure which supports it on a work shop floor. Many of the functions performed by such machine tools can also be performed by hand-held portable power tools, e.g. a portable circular saw. Hand-held power tools are considerably less expensive than stationary machine tools and occupy considerably less storage space, but in general do not readily provide the same degree of accuracy as stationary machine tools.

SUMMARY OF THE INVENTION

It is an object of the present invention to provide a worktable that enables some hand-held power tools to be used more accurately and more easily as stationary tools when attached to the worktable.

Another object of the invention is to provide a more versatile worktable.

According to one feature of the present invention, a worktable has first and second rip fences each adjustable in position on the table independently of the other.

Another feature of the present invention is a saw table having a slot for the reception of the blade of a circular saw together with first and second rip fences each adjustable in position on the table independently of the other.

Another feature of the present invention is a saw table having a slot for the reception of the saw blade of a circular saw and a guard for the blade, the guard being of a transverse dimension sufficient to accommodate the blade when inclined for bevel cutting.

Another feature of the present invention is a saw table having a slot for the reception of the saw blade of a circular saw, a rip fence adjustable in position relatively to the slot, and a guard for the saw blade movable by a workpiece during advancement of the latter along the fence towards the slot to give access to the saw blade.

The present invention also provides a saw table having a slot for the reception of the blade of a circular saw mounted beneath the table, first and second rip fences each positioned on one side of the slot and each being adjustable in position relatively to the slot independently of the other, and a guard for the saw blade movable by a workpiece during advancement of the latter along one of the fences towards the slot to give access to the saw blade. The saw blade guard may have a transverse dimension sufficient to accommodate the blade when inclined for bevel cutting.

The saw blade guard may include a riving knife so arranged as to be capable of being inclined with respect to the guard. The riving knife may support the saw blade guard. The riving knife may carry a support arm that is pivotally attached thereto for movement about a horizontal axis, and in which the support arm carries a guard portion that is pivotally attached thereto for movement about another horizontal axis, the guard portion being transparent.

The or each rip fence may be of a two-part construction of which one part comprises a fence wall and is adjustable in position relatively to the other part of the fence.

The table may also include an access aperture for accommodating the cutter of a router, a router cutter guard, and means for pivotally supporting the router guard over the aperture.

The or each rip fence may be guided for movement over the surface of the table by a slot therein.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
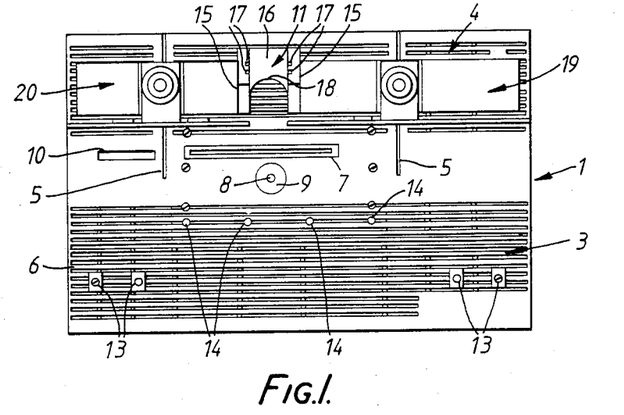
FIG. 1 is a plan view of the worktable.
Figure 2:
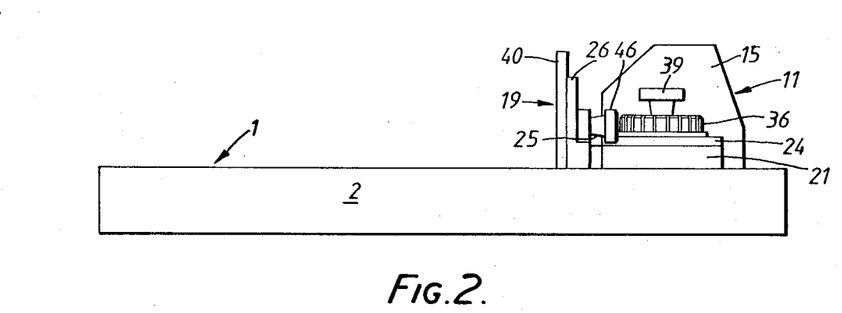
FIGS. 2 and 3 are, respectively, schematic side elevation and front views of the worktable.
Figure 3:
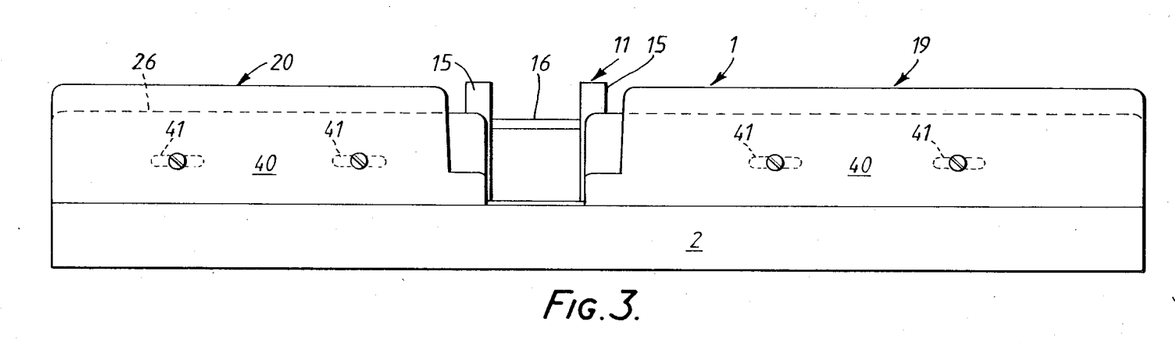

The worktable 1 shown in FIGS. 1, 2 and 3 provides a rectangular work surface on which work pieces are supported. The worktable 1 may be made from any suitable material but preferably is made from a plastics material by molding. A suitable plastics material is high impact polystyrene.

The table 1 has side walls 2 extending downwards around its periphery and has a series of strengthening ribs (not shown) beneath the surface and between the walls 2. The table has a first series of spaced parallel grooves 3 across the major part of its surface and a second series of similar grooves 4 towards one edge. At right angles to the grooves 4 are two spaced slots 5. Certain of the grooves 3 and 4 extend completely through the surface to form slots therein. One of such slots is referenced 6 and it extends almost the full width of the surface of the table and is a little wider than the other grooves and slots.

Located centrally between the series of grooves and slots 3 and 4 and the slots 5 is a wider but shorter slot 7 and a circular hole 8. The surface of the table 1 around the hole 8 is protected by a tubular metal insert 9. In line with and spaced slightly from the slot 7 is a shallow groove 10. At spaced locations over its surface, the worktable has holes some of which pass through the grooves while others are positioned in areas of the worktable where there are no grooves or slots. Examples of the latter are referenced 13, while examples of the former are referenced 14.

Between the slots 5, and located centrally thereof and of the slot 6, is a raised support 11. The raised structure 11 has spaced side walls 15 that support between them a platform 16 that is positioned below the upper edges of the side walls 15. The parts of the side walls 15 that project above the platform have short parallel slots 17 in them. As can be seen from FIGS. 1 and 6, the front edge 18 of the platform 16 is concave and of semi-circular form.

Mounted upon the worktable on each side of the raised structure 11 are rip 'fences' 19, 20 that are adjustable in position. Parts of the fences are shown in more detail in FIGS. 4 and 5. Each fence comprises a base 21 with downturned edges 22 on which the base rests on the surface of the worktable. The undersurface of the base 21 also has spaced transverse ribs 23 which extend to the surface of the worktable and provide additional support for the base over its central area where the ribs 23 are located. Transversely across the central part of the base 21 are raised parallel walls 24 whose facing surfaces locate and guide a tongue 25 that extends from a vertical wall 26 that lies along the front of the base 21. The lower edge of the wall 26 is spaced slightly from the adjacent surface of the worktable and has a longitudinal rib 26 that engages a mating groove in the front wall of the base 21. The tongue 25 and the wall 26 are movable to and fro relatively to the base 21 by sliding the tongue 25 between the walls 24. The base itself is also movable, being guided for such movement by a locking bolt 27 that passes through an elongate hole 28 in the tongue 25, a hole 29 (see FIG. 5) in the base 21, a central aperture 30 in a rectangular plate 31, and through one of the slots 5 in the worktable. The lower surfaces of the worktable bounding this slot 5 have lateral tongues 32 between which fit the square head 33 of the bolt 27 which is thus prevented from rotating.

To provide fine adjustment of the tongue 25 and wall 26 relatively to the base 21, the tongue 25 has a pin 34 (FIG. 4) upstanding from its upper surface about midway of the ends and sides of the tongue. That pin 34 locates in a cam track 35 in the undersurface of a fine adjustment knob 36 that seats on the upper surface of the tongue 25 and is held in place by the bolt 27. The upper end of the bolt 27 is screw threaded as indicated at 37. The thread 37 cooperates with an hexagonal nut 38 fixed into a knob 39. Thus, turning the knob 39 tightens the lower end of the knob on to the upper face of knob 36 and clamps in position not only the tongue 25 but also the base 21. Slackening the upper knob 39 slightly enables a user to rotate the lower knob 36 and this produces movement of the tongue 25 relatively to the base 21, such movement being accommodated by the elongate slot 28 in the tongue.

The rectangular plate 31 is a loose fit between the ribs 23 and is prevented from rotating by pins (not shown) extending from its lower surface into the respective slot 5.

Figure 4:
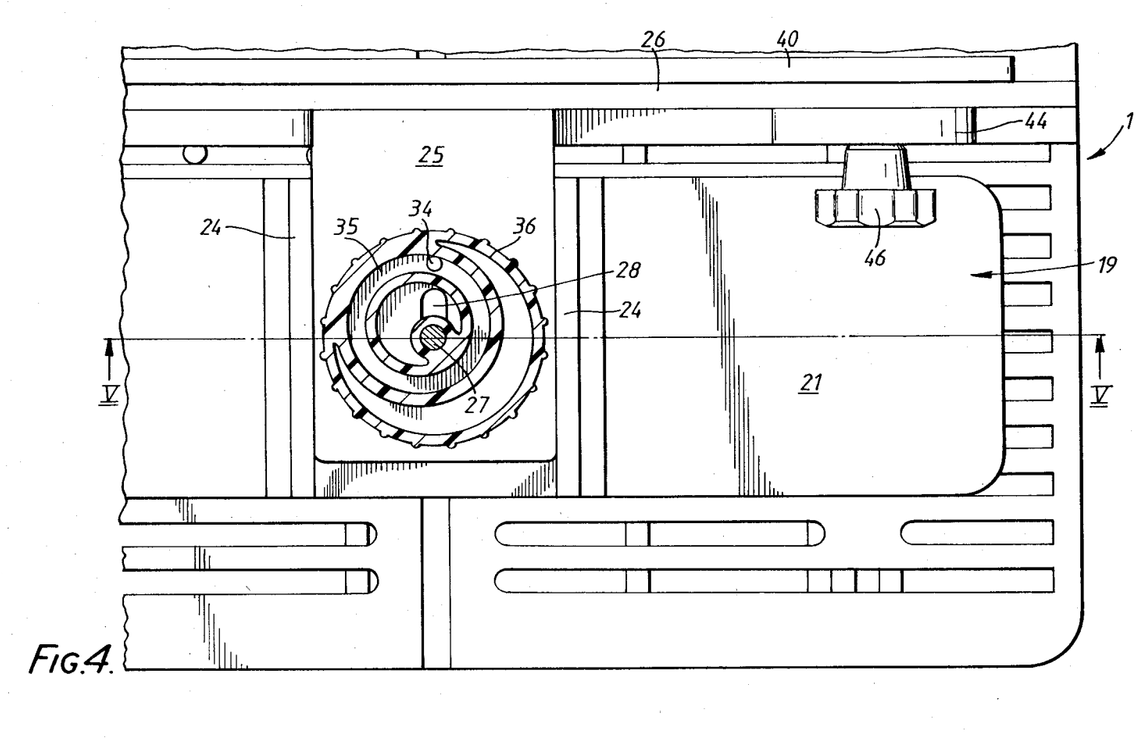
FIG. 4 is a plan view partly in section on an enlarged scale of part of the worktable.
Figure 5:
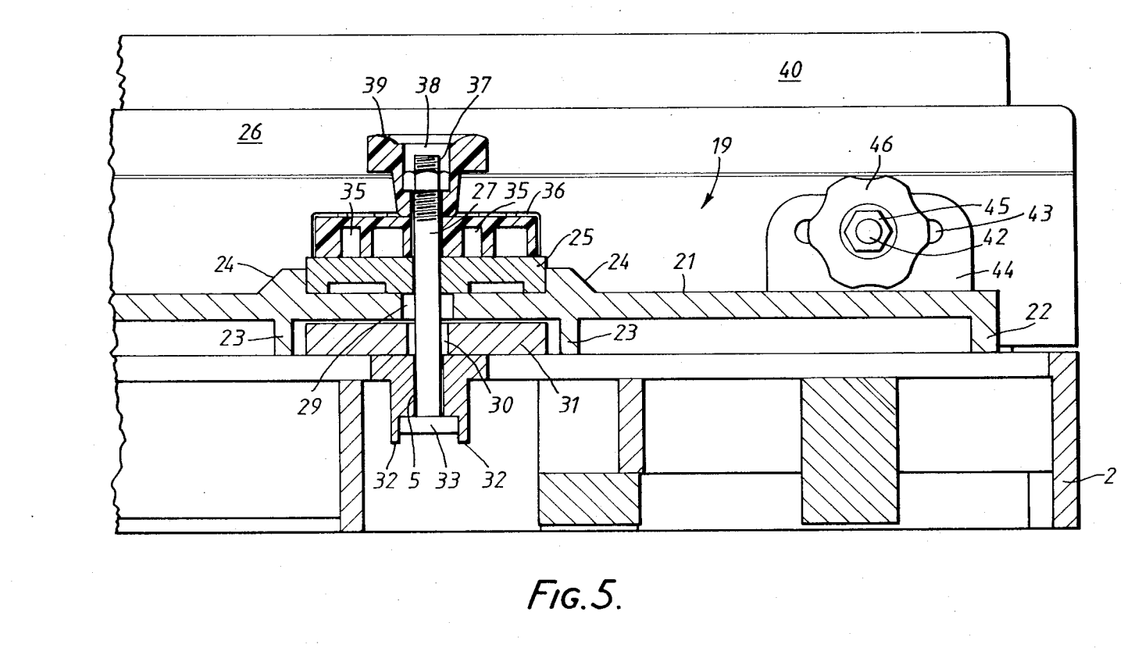
FIG. 5 is a section on the line V—V of FIG. 4.

The vertical walls 26 of the fence units 19, 20 normally form the actual rip fences, but in certain countries they must be fitted with fascias and FIGS. 4 and 5 show one way of fitting the fascias which are indicated at 40. The fascias are elongate smooth-faced strips with spaced holes 41 (FIG. 3) through which extend fixing bolts 42 (FIG. 5). The bolts extend through slots 43 in bosses 44 on the rear faces of the walls 26, the rear face being the one visible in FIG. 5. The bolts 42 carry hexagonal nuts 45 fixed into a knob 46. Once the fascia plate is correctly positioned relatively to the wall 26, it is clamped in place by turning the knob 46.

It will be appreciated that the two fences 19, 20 are adjustable independently if required by a user. This enables them to be placed in different positions to compensate for material removed from a workpiece when carrying out an "edging" operation. When set in the same line, the fences act as an effective "rip guide".

Figure 9:
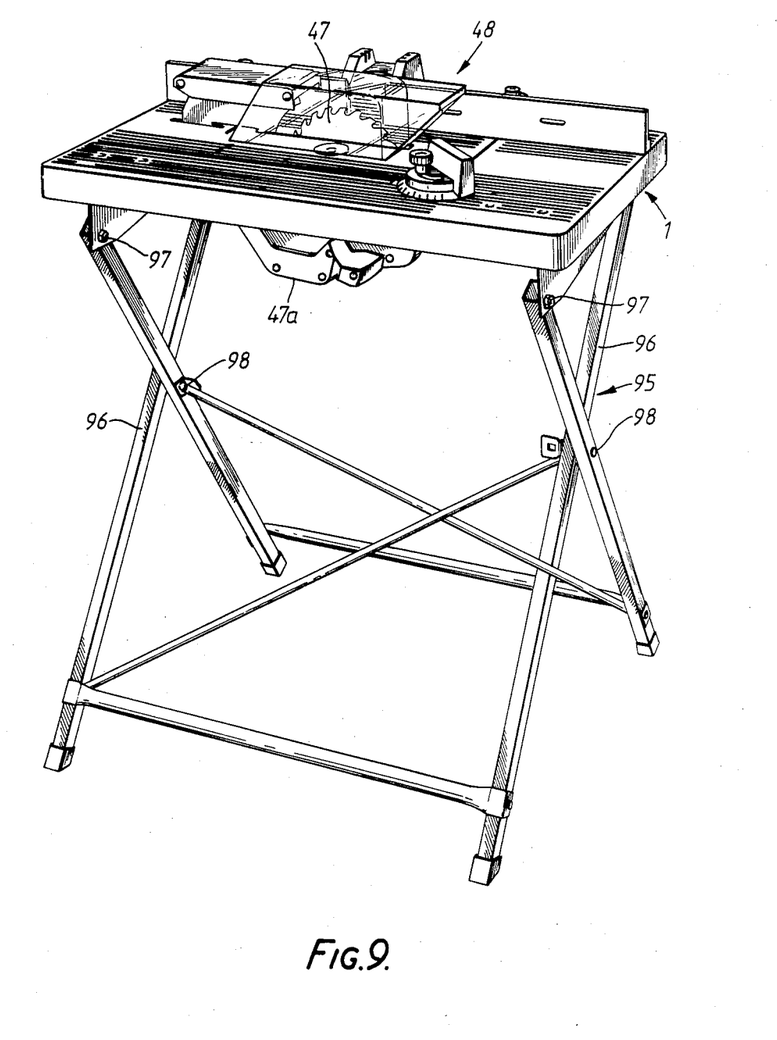
Figure 10:
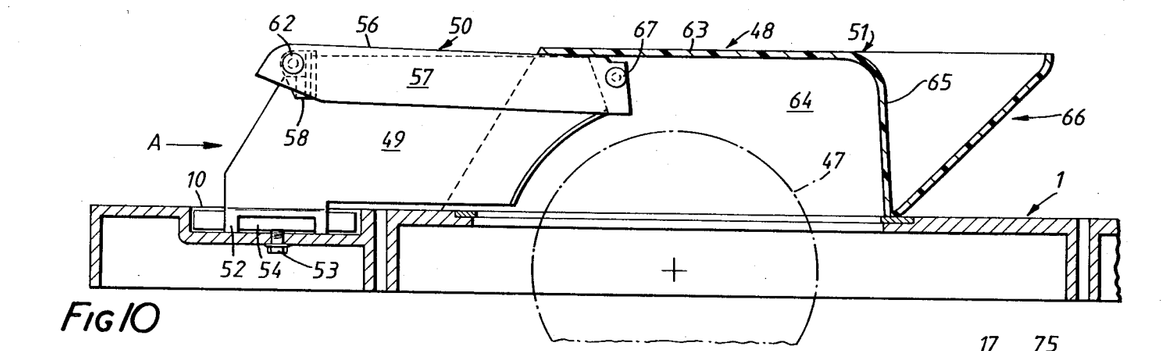
FIGS. 10 and 11 are side views partly in section of two forms of tool guard.
Figure 12:
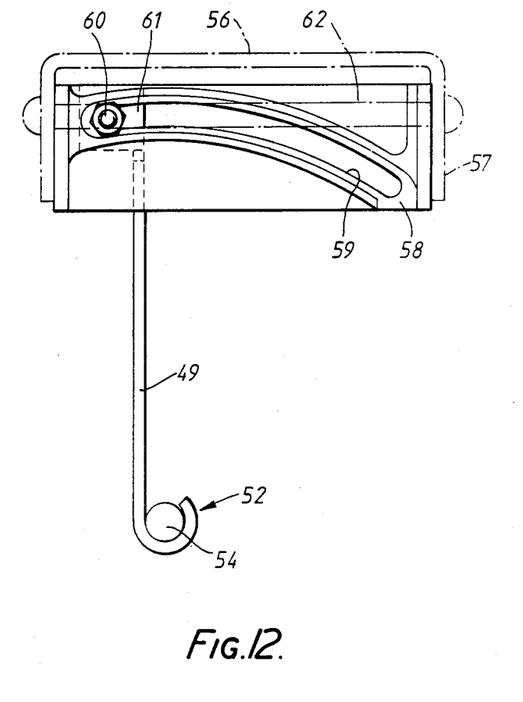
FIG. 12 is a view of some components in the direction of arrow A in FIG. 10.
Figure 13:
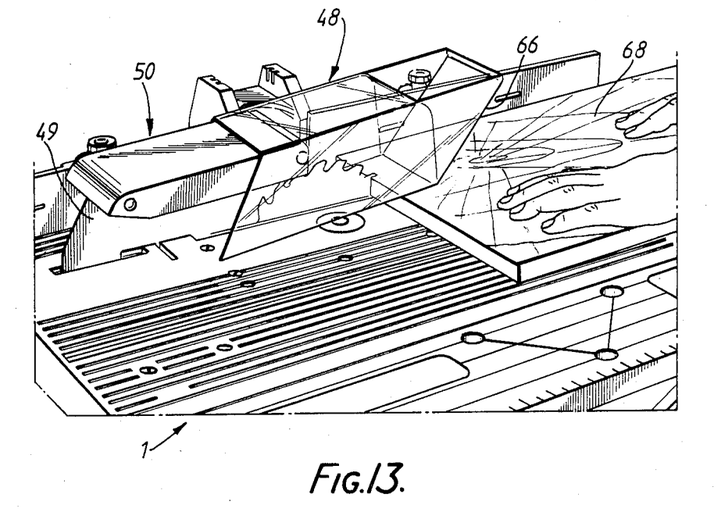
FIGS. 13 and 14 are perspective views of parts of the worktable illustrating different modes of use.

When used as a saw table, a circular saw is secured to the undersurface of the table 1 so that the circular blade of the saw extends upwardly through the slot 7. FIGS. 9 and 13 show a part of the table with the circular saw fitted and it will be seen that a portion 47 of the circular blade is visible as is a part of the body of the saw housing 47a. Before the circular saw is used, the table is fitted with a guard 48 shown in FIGS. 6, 9 and 13 and in greater detail and on an enlarged scale in FIG. 10. The guard 48 comprises three main parts, a support strut 49 (which forms a riving knife as later explained), a support arm 50 and a guard portion 51. The support strut 49 has a rolled end 52 that locates in the shallow groove 10 referred to above and is secured therein by a bolt 53 that is screwed upwardly through the surface of the table 1 into a threaded hole in a bar 54 seated in the end 52. The support arm 50 is in the form of an elongate shallow hood having a top 56 and shallow side walls 57. Extending between the side walls 57 at one end of the arm 50 is a bracket 58 that has an arcuate slot 59 (FIG. 12) through which passes a bolt 60 that secures the arm 50 to the strut 49 whose upper end is formed to provide an ear 61 with a threaded hole into which bolt 60 screws. The arm 50 is pivotally attached to the strut 49 by a spindle 62.

The guard portion 51 is of inverted channel form with a base 63 and depending side walls 64. One end of the channel is closed by an end wall 65, a wedge shaped extension 66 of the guard being located to the right of the end wall 64 as viewed in FIG. 10. As can also be seen from FIG. 10, the right-hand end of the arm 50 extends into the left-hand end of the guard 51, the two being pivotally connected by a bolt 67. The strut 49 is of metal as is the support arm 50, but the guard portion 51 is of a transparent material, for example a transparent plastics material.

FIG. 13 illustrates the guard 48 in use. A user wishes to saw a length of timber 68 which is placed on the surface of the table 1 as shown. The rip fences are adjusted to align the timber 68 with the cutting edge of the saw blade at the site where the cut is to be made, and then clamped. The user then advances the length of timber along the surface of the table 1 keeping one edge of the timber firmly against the fence. As the leading edge of the timber comes into contact with the wedge shaped end 66 of the guard 48 and lifts it, the guard portion 51 pivots about bolt 67 and the timber moves beneath the guard portion 51 into contact with the saw blade. As movement of the timber continues, the guard portion 51 lifts sufficiently to cause the support arm 50 to pivot about the bolt 62. The saw-cut parts of the timber pass on either side of the strut 49 which acts as a riving knife. Pivotal movement of the guard portion 51 and the support arm 50 is the minimum necessary to permit passage of the timber thereby ensuring the maximum protection to the user. When the length of timber has been cut, the guard portion 51 and support arm 50 return to their original positions under gravity. At all times the user is able to observe the cut being made by the saw as this is clearly visible through the transparent walls of the guard portion 51.

It will be appreciated that the cutting operation just described is shown in FIG. 13 with the circular saw blade in a vertical plane. Angle cutting up to about 45° is also possible by suitable adjustment of the circular saw followed by pivotal movement of the strut 49 to align it with the now inclined saw blade. During such pivotal movement, the bolt 60 travels along the slot 59 (FIG. 12) and when the strut is aligned with the blade the bolt 60 is tightened to clamp the strut in the set position. During the pivotal movement of the strut, the support arm 50 and the guard portion 51 do not change positions. The internal width of the guard portion 51 between the side walls 64 is sufficient to accommodate the inclination of the saw blade up to about the value of 45° mentioned above. It is not necessary therefore to incline either the support arm 50 or the guard portion 51.

Figure 7:
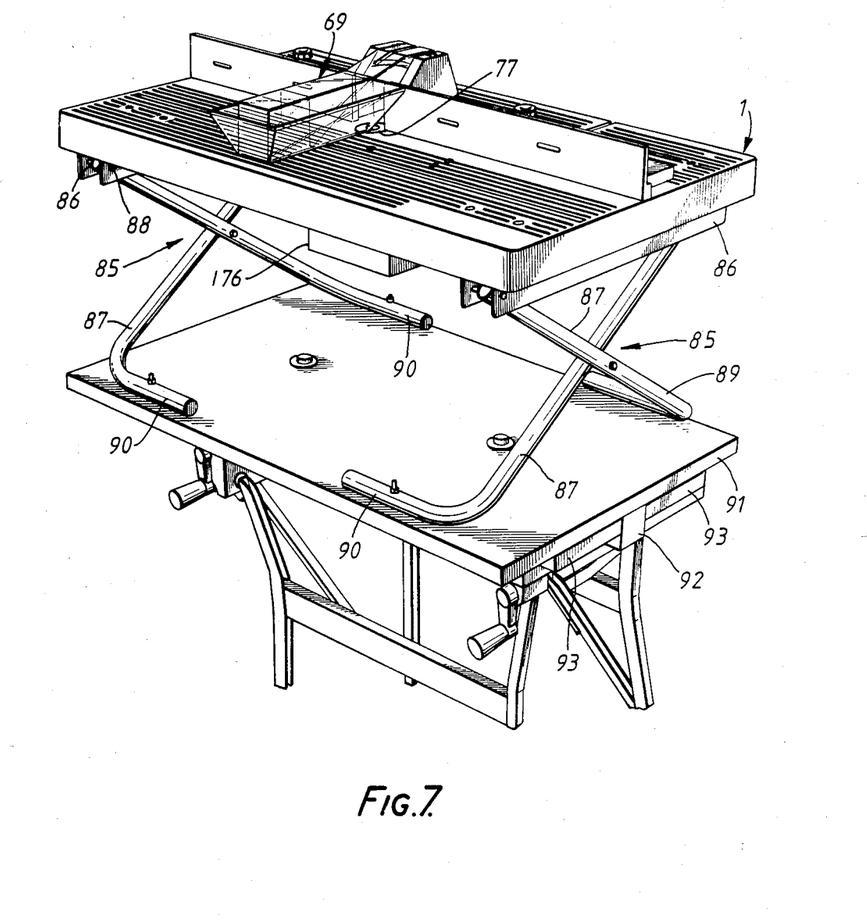
FIGS. 7, 8 and 9 are perspective views of the worktable mounted upon other forms of workbench.

The worktable 1 can also be used as a router table, the router being secured beneath the table with its cutter extending through the hole 8. Before use, a router guard is placed in position. The router guard 69 is shown in detail in FIG. 11. It is an elongate box-like structure of a transparent material of a width sufficient to enclose the cutter of the router with adequate clearance. The router guard has a central box with a flat top 70 and side walls 71. The box is closed at one end by an end wall 72 and at its other end has two longitudinally extending arms 73 interconnected by a bridging piece 74. Each arm has an outwardly-projecting stub axle 75. Externally of each side wall 71 is a sloping surface 76 that inclines inwardly towards the bottom edge of the side wall 71 as can be seen in FIG. 7. The router guard 69 is mounted upon the raised structure 11 by locating the stub axles 75 in one of the pairs of parallel slots 17 in the projecting parts of the side walls 15 of the raised structure 11. As thus mounted, the router guard 69 rests upon the surface of the table 1 and can pivot about the stub axles 75 in a vertical plane. FIG. 7 shows the body 176 of the router beneath the table 1 with the cutter 77 just visible inside the guard 69.

Figure 11:
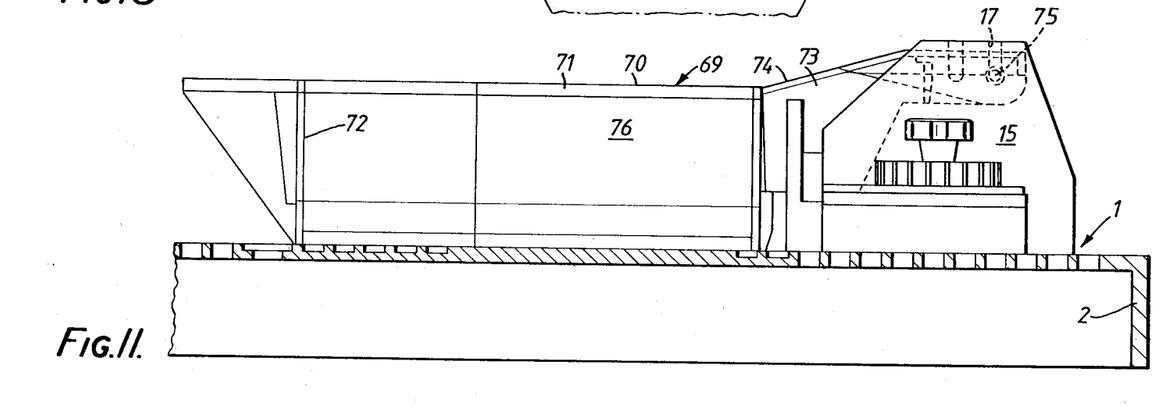

Before use, the rip fences 19, 20 are brought to a required position and clamped therein. A length of timber to be machined by the router cutter 77 is placed against one of the rip fences and then advanced along the fence towards the cutter. The end of the length of timber contacts the sloping surface 76 on the nearer side of the guard and the latter is forced upwardly allowing the timber to move beneath the guard and into contact with the cutter. Once the length of timber has cleared the cutter and the guard 69, the latter drops back under gravity to its original position resting on the surface of the table 1.

It is also possible to machine a length of timber of small width by advancing the timber end on to the free end of the guard. The timber passes beneath the guard and over the cutter and emerges between the side walls 15 of the structure 11.

Figure 6:
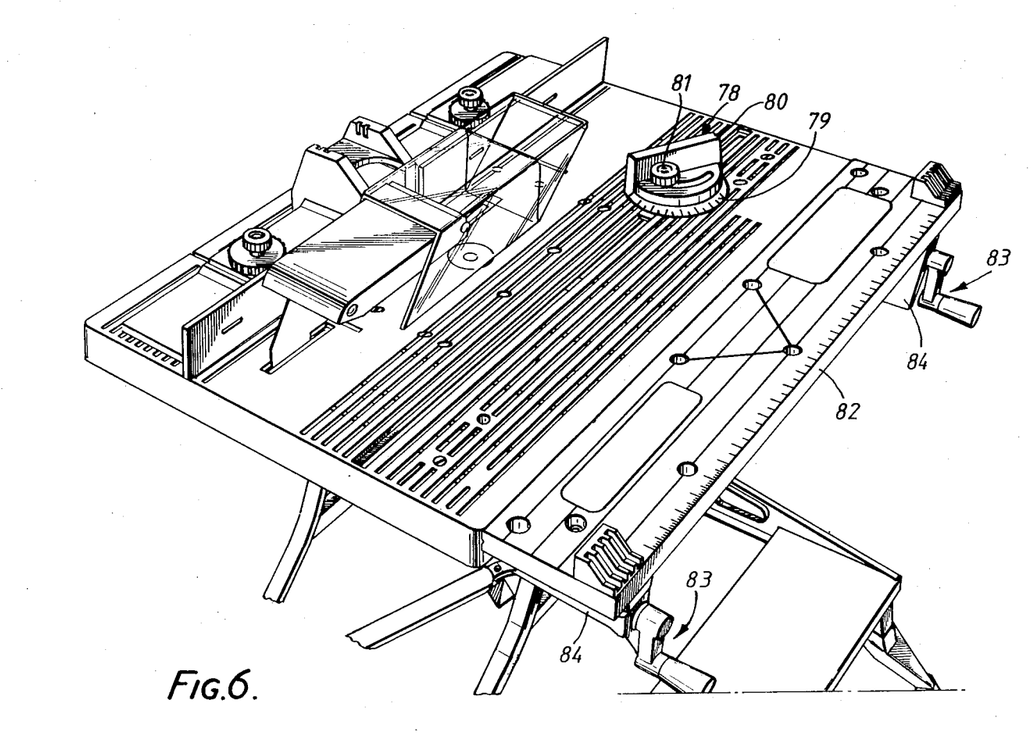
FIG. 6 is a perspective view of the worktable mounted on a workbench.
Figure 14:
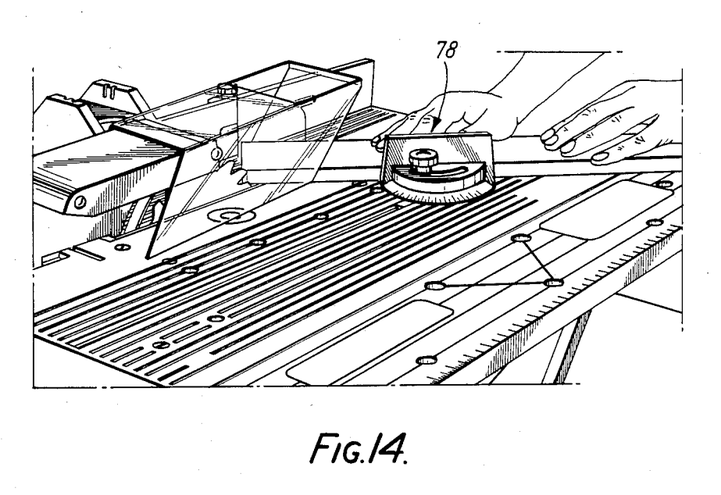

The worktable can also be used for the angle cutting of workpieces by using a mitre guide 78 shown in FIGS. 6 and 9, and in use in FIG. 14. The guide 78 is a block of a suitable plastics material with a semi-circular base 79 and a diametrical plane wall 80. Passing through the base 79 is a screw having at its upper end a knob 81. The mitre guide 78 can be secured to the worktable by passing this screw through one of the holes 14 or through the slot 6 and then, by turning the knob 81, tighten the screw to clamp the mitre guide after first rotating it so that the wall 80 is set to a required inclination. A length of timber to be angle cut is then placed against the wall 80 as indicated in FIG. 14 and advanced towards the circular saw blade. The guard 48 is lifted by the leading end of the timber as that end contacts the guard and moves towards the saw blade.

The worktable 1 can be mounted upon a suitable support which may be a portable collapsible workbench as shown in FIG. 6. The workbench has an elongate vice jaw member 82 movable by turning handles 83 along spaced support arms, parts of which are shown at 84 and which extend away from the jaw 82 in a direction generally at right angles to the jaw. The support arms have slot-like apertures, preferably keyhole apertures, into which locate studs on the lower surface of the worktable. Once the worktable has been placed in position on the support arms and the studs engaged in the slot-like apertures, the handles 83 are turned to advance the movable vice jaw member 82 towards the worktable to clamp the latter in position. The worktable can then be used to carry out any of the operations described above. Space is provided between the support arms 84 to accommodate the circular saw or router when secured to the undersurface of the table. More detailed descriptions of this style of workbench are contained in U.S. Pat. Nos. 4,127,260 and 4,061,323 the disclosures in both of which are hereby incorporated herein by reference.

An alternative form of mounting of the worktable is shown in FIG. 7. The table 1 is mounted upon collapsible leg supports 85. Each support comprises a cross member 86 to which the table 1 is secured by screws, and legs 87 pivotally attached to the cross member 86 as at 88 and to each other at 89. The legs 87 have inturned ends 90 which are bolted or otherwise secured to a baseboard 91. The baseboard 91 has a lateral rib 92 secured to it and this is clamped between the elongate jaw members 93 of a workbench which may be constructed as described in U.K. Patent Specification Nos. 1,267,034 and 1,471,118. The arrangement shown in FIG. 7 sites the worktable 1 at a greater height than would be the case if the table 1 was mounted directly on the jaw member 93, and thus may be more convenient for the user in performing some operations.

Figure 8:
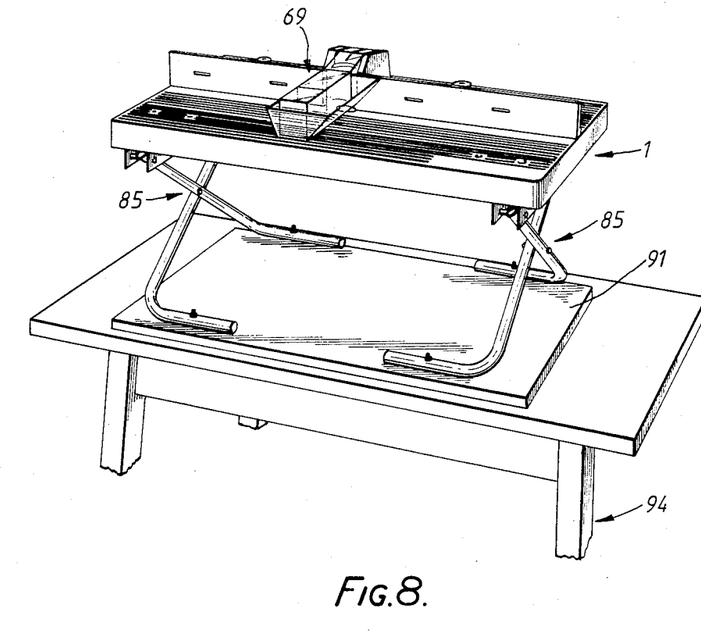

It is not essential to use a workbench of the form shown in FIG. 7. The baseboard 91 may be placed directly on a conventional carpenter's bench 94 as shown in FIG. 8. In that case, however, the lateral rib 92 is removed before the baseboard is placed on the bench. The baseboard is secured to the bench in some convenient way, for example by bolts, screws or clamps.

The worktable 1 may also be permanently mounted upon a support structure as shown in FIG. 9. The structure comprises support members 95 to which pairs of legs 96 are pivotally connected as at 97. The legs of each pair are also pivoted to each other as at 98. Preferably, the connections of the pairs of legs to the support members 95 permit the structure to be collapsed for storage purposes and to enable it to be more easily carried from one site to another.

When the worktable 1 carries a power tool, for example a circular saw or a router, a switch box may also be attached to the worktable at a convenient point. The switch box can include one or more sockets for receiving the connection plug or plugs of the tools, and has a drop lead by which the box can be connected to a power source. The box may have a main control switch operated by depressing a control knob, this enabling a user rapidly to effect de-energisation of a power tool should that be desired. The switch box may also incorporate a no-volts release relay.

The above described embodiments, of course, are not to be construed as limiting the breadth of the present invention. Modifications, and other alternative constructions, will be apparent which are within the spirit and scope of the invention as defined in the appended claims.

What is claimed is:

1. A worktable, comprising:
a horizontal work surface having a slot therein for reception therethrough of a saw blade of a circular saw when mounted, in use, to the worktable below said work surface;
first and second rip fences mounted on said work surface and extending parallel to said slot;
first adjusting means for adjusting said first rip fence relative to said slot for adjusting the distance at right angles to said slot between said first rip fence and said slot;
second adjusting means for adjusting said second rip fence relative to said slot for adjusting the distance at right angles to said slot between said second rip fence and said slot;
said first and second adjusting means being independently actuatable to independently adjust the distance of each of said rip fences from said slot to enable the rip fences to be positioned at different distances from the slot and also to enable the rip fences to be aligned with each other at a common distance from the slot; and
said work surface having two adjusting slots extending transversely to the saw blade slot and disposed beyond opposite ends of said saw blade slot, said first and second adjusting means being engaged in and movable along said adjusting slots.

2. The worktable of claim 1, wherein said work surface has an aperture therein for reception therethrough of a cutter of a portable router when mounted, in use, to the worktable below said work surface, said hole being located to one side of and adjacent said saw blade slot intermediate ends of the latter, and said rip fences being disposed on an opposite side of said saw blade slot.

3. The worktable of claim 2, further comprising a tubular metal insert mounted in said work surface around said aperture for protection of said aperture.

4. The worktable of claim 1, further comprising a saw blade guard pivotally mounted above said work surface over said slot.

5. The worktable of claim 4, wherein said guard is pivotally mounted at a location beyond one end of said slot, and said guard has an inclined wall beyond the other end of said slot, said wall being inclined upwardly away from said slot for engagement by a workpiece to be cut to pivot said guard upwardly by movement of the workpiece towards the blade.

6. A worktable, comprising:
a horizontal work surface having a slot therein for reception therethrough of a saw blade of a circular saw when mounted, in use, to the worktable below said work surface;
first and second rip fences mounted on said work surface and extending parallel to said slot;
first adjusting means for adjusting said first rip fence relative to said slot for adjusting the distance at right angles to said slot between said first rip fence and said slot;
second adjusting means for adjusting said second rip fence relative to said slot for adjusting the distance at right angles to said slot between said second rip fence and said slot;
said first and second adjusting means being independently actuatable to independently adjust the distance of each of said rip fences from said slot to enable the rip fences to be positioned at different distances from the slot and also to enable the rip fences to be aligned with each other at a common distance from the slot;
a riving knife connected to and extending above said work surface in alignment with said slot;
a saw blade guard supported by said riving knife;
said riving knife carrying a support arm pivotally attached thereto for movement about a horizontal axis perpendicular to said slot; and
said support arm carrying a guard portion pivotally attached thereto for movement about a second axis parallel to but spaced from said horizontal axis.

7. The worktable of claim 6, wherein said guard portion is transparent.

8. The worktable of claim 6, including means for adjustably inclining said riving knife relative to said work surface to enable said riving knife to be in alignment with the saw blade when inclined for bevel cutting.

9. A worktable, comprising:
a horizontal work surface having a slot therein for reception therethrough of a saw blade of a circular saw when mounted, in use, to the worktable below said work surface;
first and second rip fences mounted on said work surface and extending parallel to said slot;
first adjusting means for adjusting said first rip fence relative to said slot for adjusting the distance at right angles to said slot between said first rip fence and said slot;
second adjusting means for adjusting said second rip fence relative to said slot for adjusting the distance at right angles to said slot between said second rip fence and said slot;
said first and second adjusting means being independently actuatable to independently adjust the distance of each of said rip fences from said slot to enable the rip fences to be positioned at different distances from the slot and also to enable the rip fences to be aligned with each other at a common distance from the slot;
a raised support mounted on said work surface between said first and second rip fences;
said raised support comprising spaced apart side walls supporting between them a platform raised above said work surface but below upper edges of said side walls; and
said platform having an edge disposed towards said saw blade slot, said edge being of semi-circular form.

10. The worktable of claim 9, wherein parts of said side walls projecting above said platform have slots therein for mounting a router guard.

11. A worktable, comprising:
a table top having an opening therethrough for reception of a cutting element of a portable power tool when mounted, in use, below said table top, said table top having a front edge and a rear edge with said opening therebetween;

first and second fences mounted on said table top between said opening and said rear edge, said fences extending parallel to said rear edge;

two adjusting slots in said table top, said adjusting slots extending transversely to said rear edge one on each side of said opening;

first adjusting means, mounted slidably in one of said adjusting slots, for adjusting the distance of said first fence from said opening; and second adjusting means, mounted slidably in another of said adjusting slots, for adjusting the distance of said second fence from said opening.

12. The worktable of claim 11, wherein each of said fences comprises a base portion movable relative to said table top, and a fence wall mounted on and adjustable in position relative to said base portion.

13. The worktable of claim 12, wherein said base portion is telescopically engaged with a portion of said fence wall.

14. The worktable of claim 13, wherein said base portion includes a slideway, and said fence wall has a tongue slidably engaged in said slideway.

15. The worktable of claim 11, wherein:
each of said adjusting means comprises a bolt extending upwardly through the respective adjusting slot and having at an upper end a rotatable control knob, rotation of said knob clamping the respective fence against said table top after the respective fence has been positioned by movement of said bolt along said respective adjusting slot; and each of said adjusting means further comprises means for effecting fine adjustment of the respective fence after having been positioned by said movement of said bolt.

16. The worktable of claim 15, wherein said fine adjustment means comprises a cam in a second rotatable knob located below and clampable by said control knob.

17. The worktable of claim 16, wherein each of said fences comprises a fence wall having a tongue slidably engaged in a base portion, said tongue having a pin projecting therefrom and engaged in a cam groove of said cam.

18. The worktable of claim 11, wherein said opening is a slot for a saw blade, said slot extending lengthwise parallel to said fences.

19. A worktable, comprising:

a table top having front and rear edges and being adapted for the mounting of hand-held power tools therebelow;

said table top having a saw blade slot therethrough extending parallel to said front and rear edges;

said table top also having a hole therethrough for accommodating a router cutter, said hole being located between said front edge and said saw blade slot intermediate ends of said saw blade slot;

two spaced apart parallel adjusting slots at right angles to said saw blade slot;

two individually adjustable rip fences disposed parallel to said saw blade slot;

each rip fence having a rip wall with a part slidably engaged in a base portion, the rip wall being parallel to said saw blade slot and slidable relative to said base portion in a direction transverse to said saw blade slot;

each rip fence being attached to said table top by a bolt extending therethrough and through a respective one of said adjusting slots;

each said bolt having a control knob screwed on an upper end for clamping the respective rip fence in position, each rip fence being adjustable in distance from said saw blade slot by loosening the respective control knob and sliding the respective bolt in its respective adjusting slot;

a fine adjustment control rotatably mounted on each of said rip fences and having a cam engaged with a cam follower on said part of the respective rip wall, rotation of said fine adjustment control effecting fine adjustment of the respective rip wall relative to the respective base portion and said saw blade slot;

a raised support mounted on said table top between said rip fences;

said raised support comprising spaced apart side walls supporting between them a platform raised above said work table but below upper edges of said side walls, parts of said side walls projecting above said platform having slots therein for releasable connection of a router guard to said raised support;

a riving knife adjustably connected to said table top and aligned with said saw blade slot; and a saw blade guard comprising an arm pivotally mounted at one end on said riving knife and a transparent guard portion pivotally mounted on an opposite end of said arm and raisably resting on said table top.

* * * * *